United States Patent [19]
Castonguay

[11] Patent Number: 5,117,563
[45] Date of Patent: Jun. 2, 1992

[54] HEAT RECUPERATOR FROM CLOTHES DRYER

[76] Inventor: Alain Castonguay, 31, du Tailleur, Lévis, Canada, G6V 8G8

[21] Appl. No.: 628,371

[22] Filed: Dec. 17, 1990

[30] Foreign Application Priority Data

Aug. 28, 1990 [CA] Canada ............................ 2024098

[51] Int. Cl.$^5$ ............................................. F26B 19/00
[52] U.S. Cl. ....................................... 34/86; 34/90; 34/133 J; 34/133 R; 165/54; 165/909
[58] Field of Search ................. 34/86, 90, 91, 82, 133, 34/133 J, 133 R; 165/54, 909

[56] References Cited

U.S. PATENT DOCUMENTS

| | | | |
|---|---|---|---|
| 4,028,817 | 6/1977 | Winstel | 34/86 |
| 4,034,482 | 7/1977 | Briscoe | 34/90 |
| 4,095,349 | 6/1978 | Parker | 34/86 |
| 4,275,510 | 6/1981 | George | 34/90 |
| 4,532,721 | 8/1985 | Gordon | 34/86 |
| 4,875,298 | 10/1989 | Wright | 34/86 |

Primary Examiner—Henry A. Bennet
Assistant Examiner—Denise L. F. Gromada

[57] ABSTRACT

In a device for recuperating heat from a clothes drier, the combination of a heat exchanger with cross streams comprising a pack of facially opposed heat exchange surfaces defining therebetween a plurality of open ended channels in which a stream of a relatively cold medium - air - is passed through one set of channels in heat exchange relationship with a second air stream from a drier passing through another set of channels, such channels terminating in a surface area corresponding to the hypothenuse section of a triangular corner closed box able to catch fluid from said exchanger, the four boxes at inlets and outlets forming hermetic cells with tight joints and able to separate humid air from dry warm air and including motor means of air circulation.

8 Claims, 7 Drawing Sheets

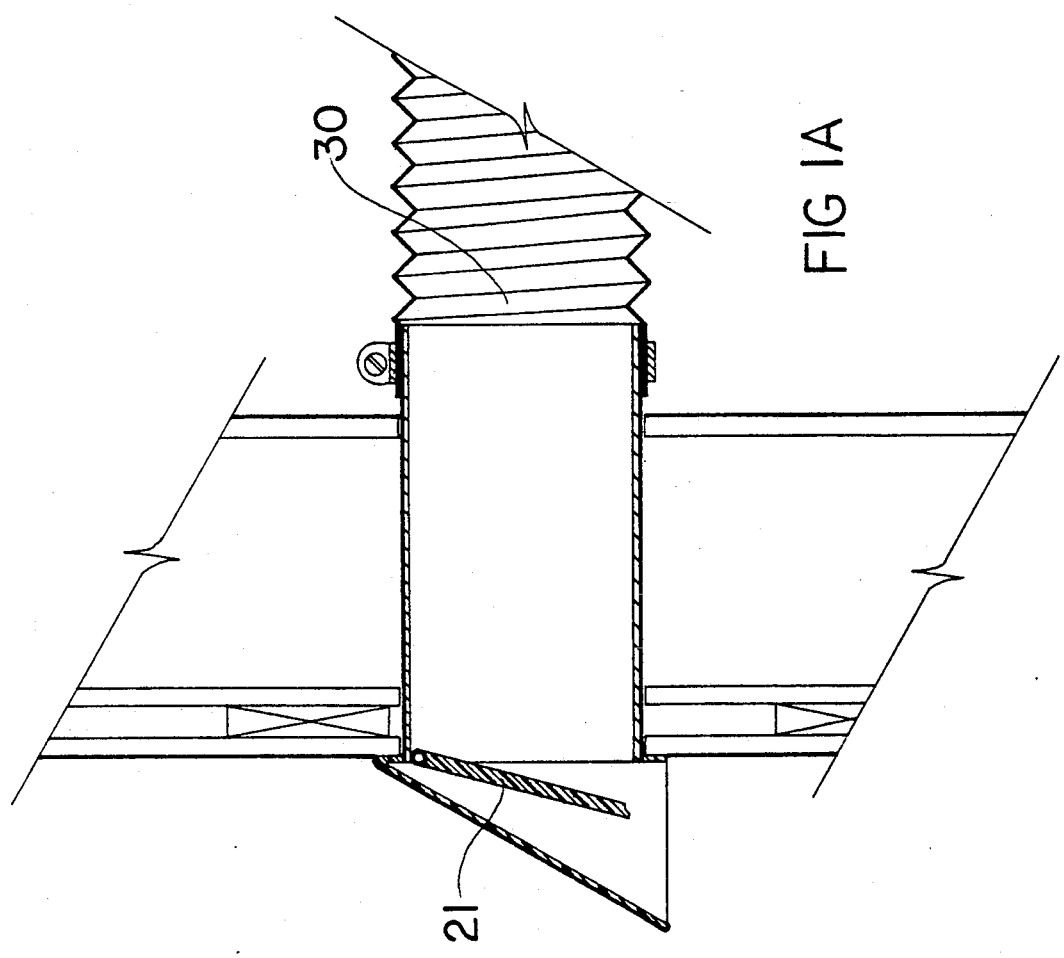

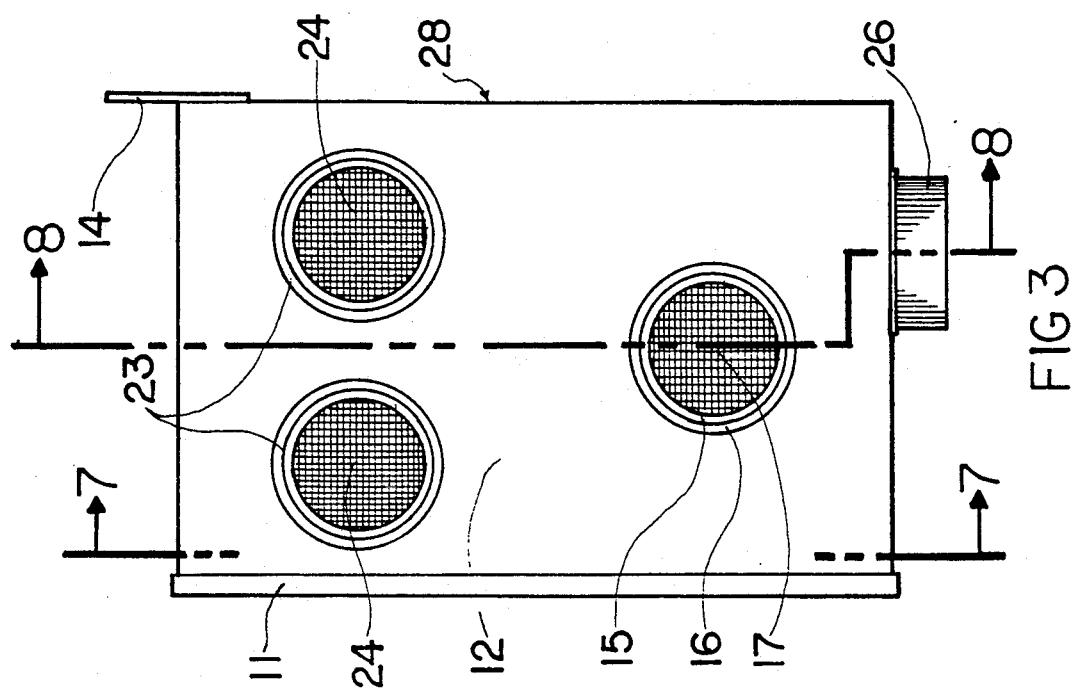
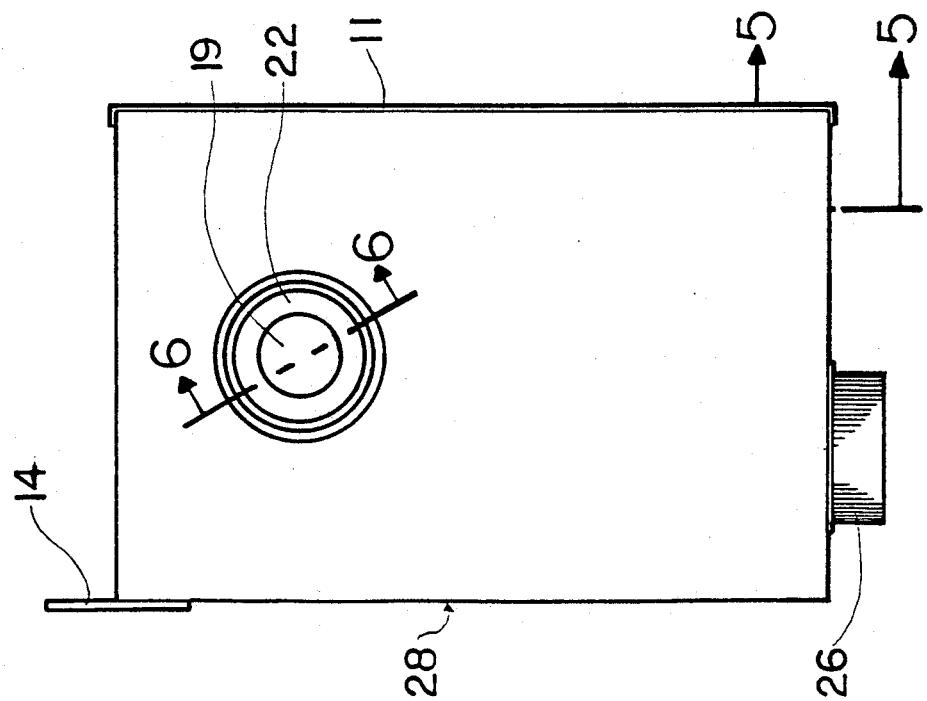

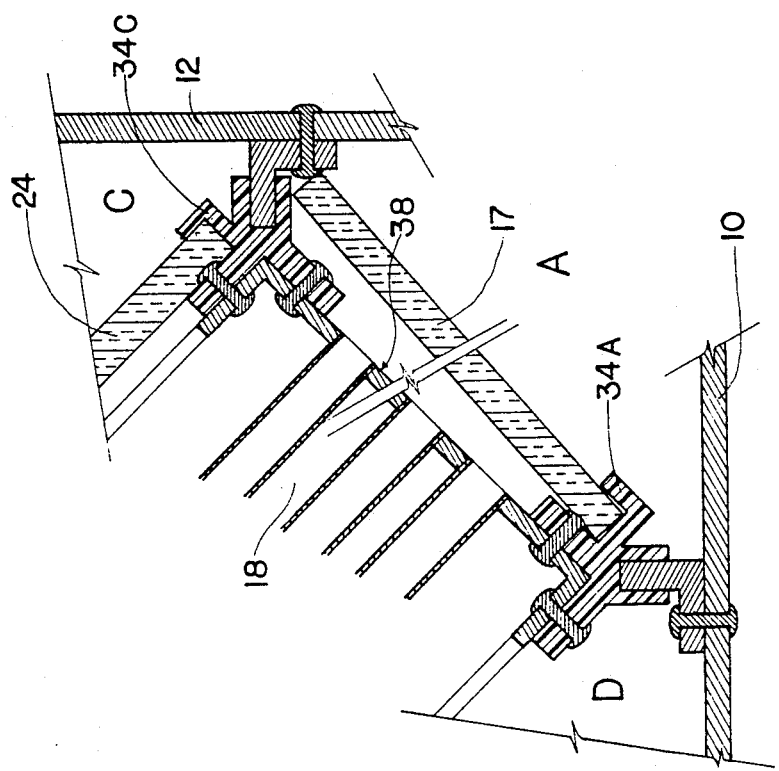
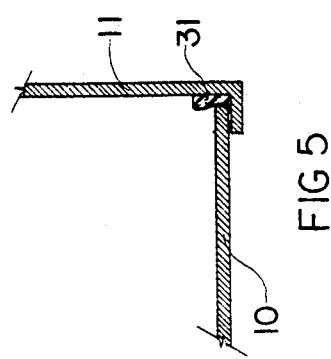
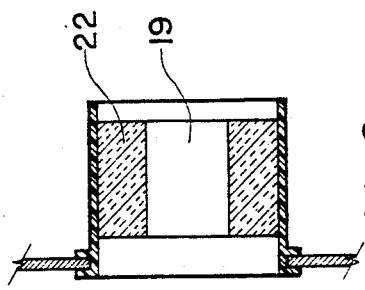

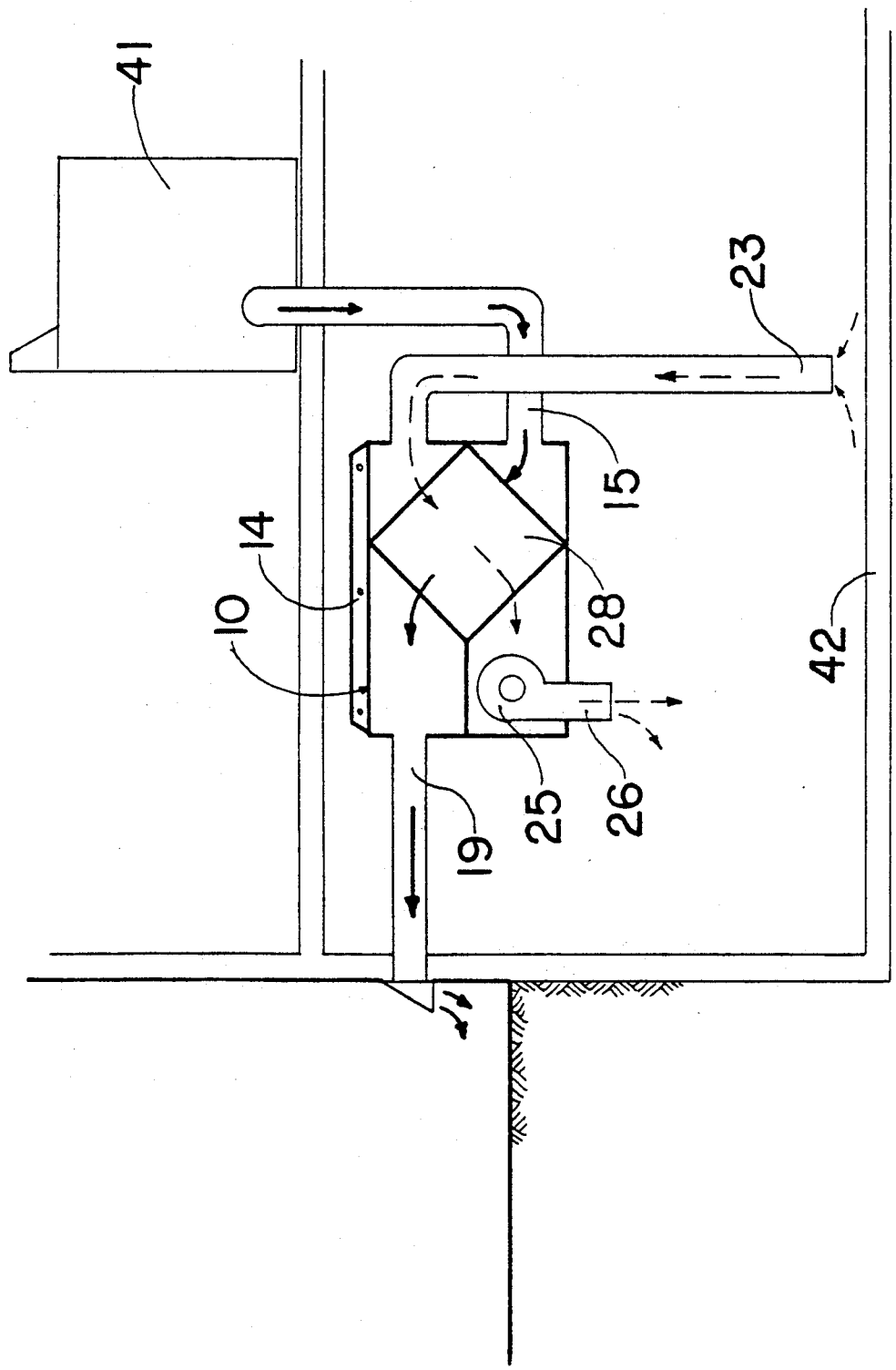

HEAT RECUPERATOR FROM CLOTHES DRYER

The invention describes a device installed in a house externally to a clothes dryer and connected at the outlet of pipe of a clothes dryer in order to use the energy liberated by the dryer at its exit to preheat ambiant air. Normally clothes dryers utilize ambiant air and heat it with an electric element and pass it through a tumbling array of web clothes from which the air absorbs moisture, the dryer being provided with a fan which pushes warm moist air through an exit pipe and a duct to the outside of a house of building, thereby wasting the energy content namely the sensible heat of hot and moist air from the dryer. In winter the extraction of air from a house implies infiltration of cold air, thereby lowering temperature, humidity and the comfort of the house.

Attempting to recuperate warm humid air also implies recuperating the lint by means of a filtration operation, several operations resulting in a high cost.

A need has been developed for a method to recuperate heat from a clothes dryer before heat is exhausted to the outside of a building.

An object of this invention is to provide a unit for cooling and condensing warm humid air from a clothes dryer and recuperating such heat in ambiant room air. A further object is to provide a unit separate from the dryer and which can be localized in any convenient area in the building.

PRIOR ART

Patent Can 1094542 uses a fluid cross transfer system to remove frost from a heat exchanger but not to recuperate heat nor to separate humidity. System imposes a partial restriction to the entrance area of the cold air input and does not dry ambiant air.

Mathews in U.S. Pat. No. 3384165, 5/1968 uses a modular system with a vent stack and a propeller to direct air flow in one direction or the other. The sense of the fan makes the fan draw air or push air. The system exchanges heat between two modules by means of a common heat sink and does not filter lint nor separate humidity, otherwise than by means of a water pool.

Doty in U.S. Pat. No. 12/1976 discloses a portable system away from clothes dryer and separating lint from dryer but keeps heat and moisture; the system utilises the pressure energy of the dryer but at the same time it causes a back pressure on the dryer.

Parker in U.S. Pat. No. 4095349, 6/1978 discloses a filter followed by a heat exchanger for commercial applications.

Clark in U.S. Pat. No. 4137647, 2/1979 utilises a row of several filters.

Callison in U.S. Pat. No. 4425901, 6/1984 utilises a cross flow heat exchange system in wood burning store.

Martin in U.S. Pat. No. 4550773, 11/1985 uses a laminar flow of fluid and in addition causes a succion. The system draws warm air from ceiling of house through one side of a cross type heat exchanger, pulls warm air through a central core and sends it out to the exterior. On the other side of the cross, the system pulls exterior cold air, sends it through the central core and returns it to the warm air conduits; the system utilizes two motors.

Courchesne in U.S. Pat. No. 4653575, 03/1987 utilizes a group of tubes such as old neons in which circulates warm and humid air and around which passes cold air.

Wright in U.S. Pat. No. 4875298, 10/1989 utilizes a tube loop as preheater for clothes dryer.

I have conceived a heat recuperating device utilizing dryer pressure and heat, while exhausting dryer products to the outside, said device localized at a convenient distance from dryer, and not altering existing clothes dryer.

The above mentioned and other advantages of the invention will better be understood in reference to the following description and drawings in which the corresponding parts are identified by same numbers of reference.

FIG. 1A is a cut view of exit wall and cover

FIG. 3 is a view at right side as per line 3—3 of FIG. 2

FIG. 4 is a view of left side as per line 4—4 of FIG. 2

FIG. 5 is a cut through closed lid and box, according to line 5—5 of FIG. 4 expanded, in position indicated by line 5—5 of FIG. 2

FIG. 6 is a cut according to line 6—6 of FIG. 4

FIG. 7 is a cut view as per line 7—7 of FIG. 3 enlarged

FIG. 9 is a schematic representation of an installation

Figure 1:
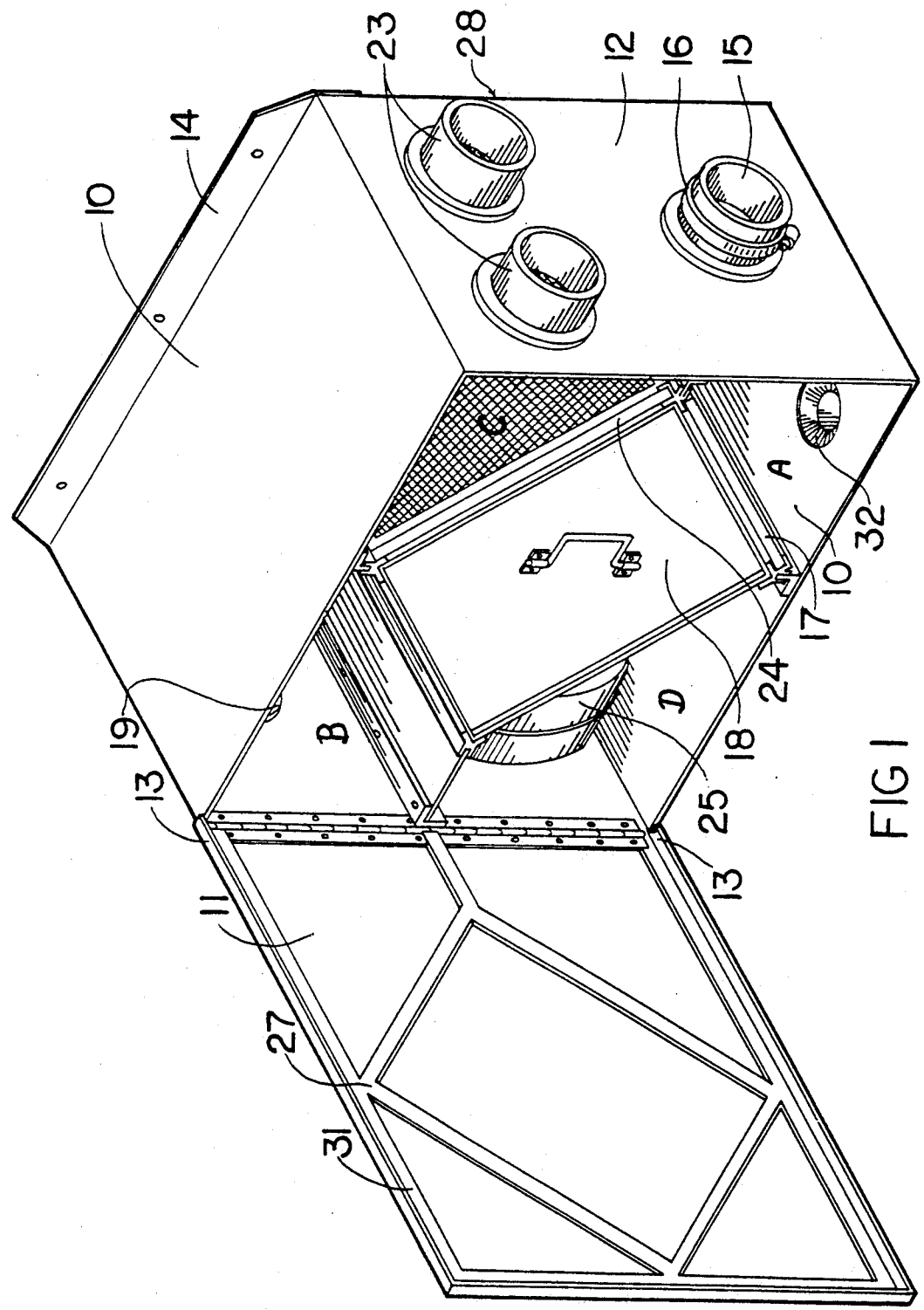
FIG. 1 is a perspective of the interior of the box, open
Figure 2:
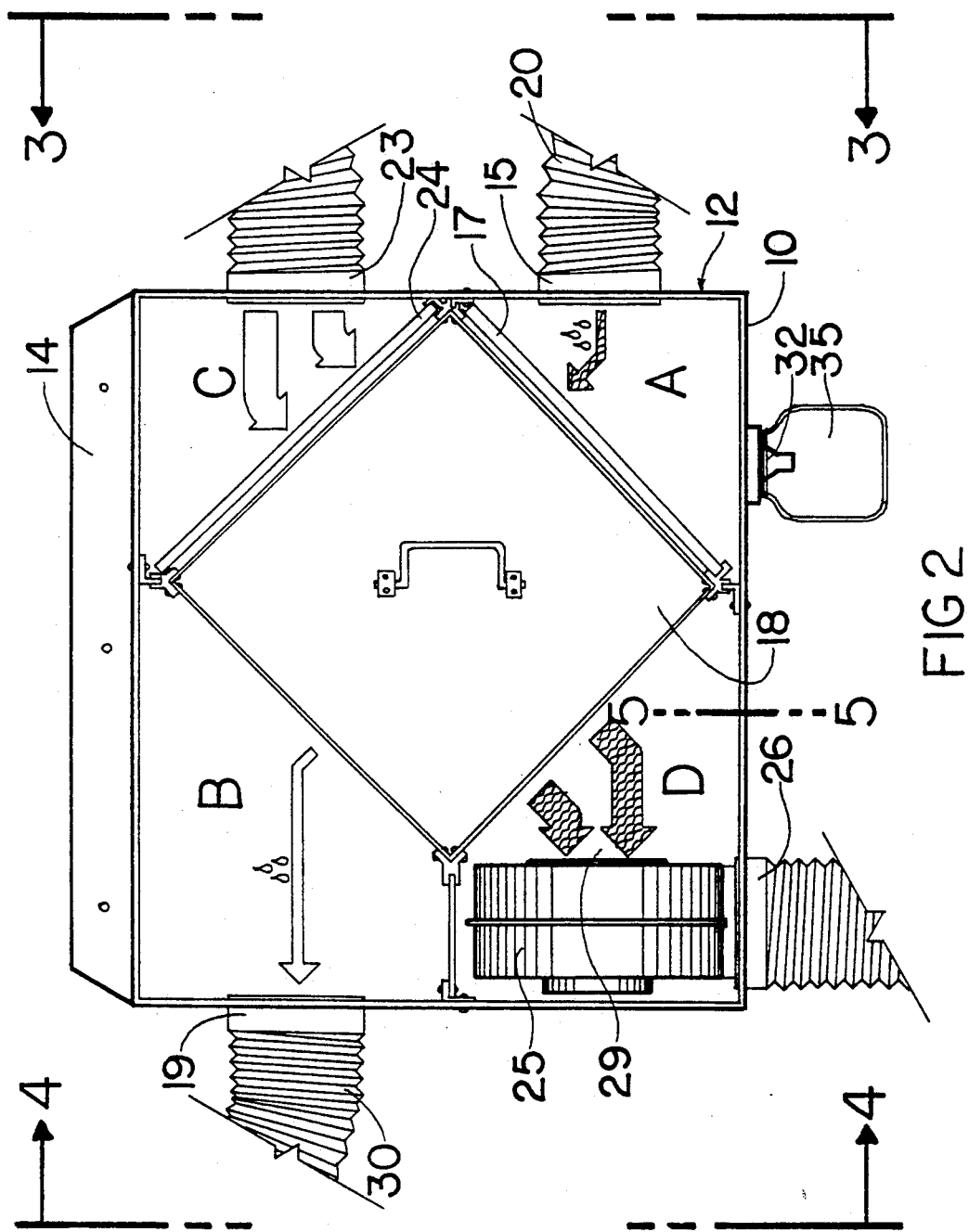
FIG. 2 is a front view of device lid being open and removed
Figure 8:
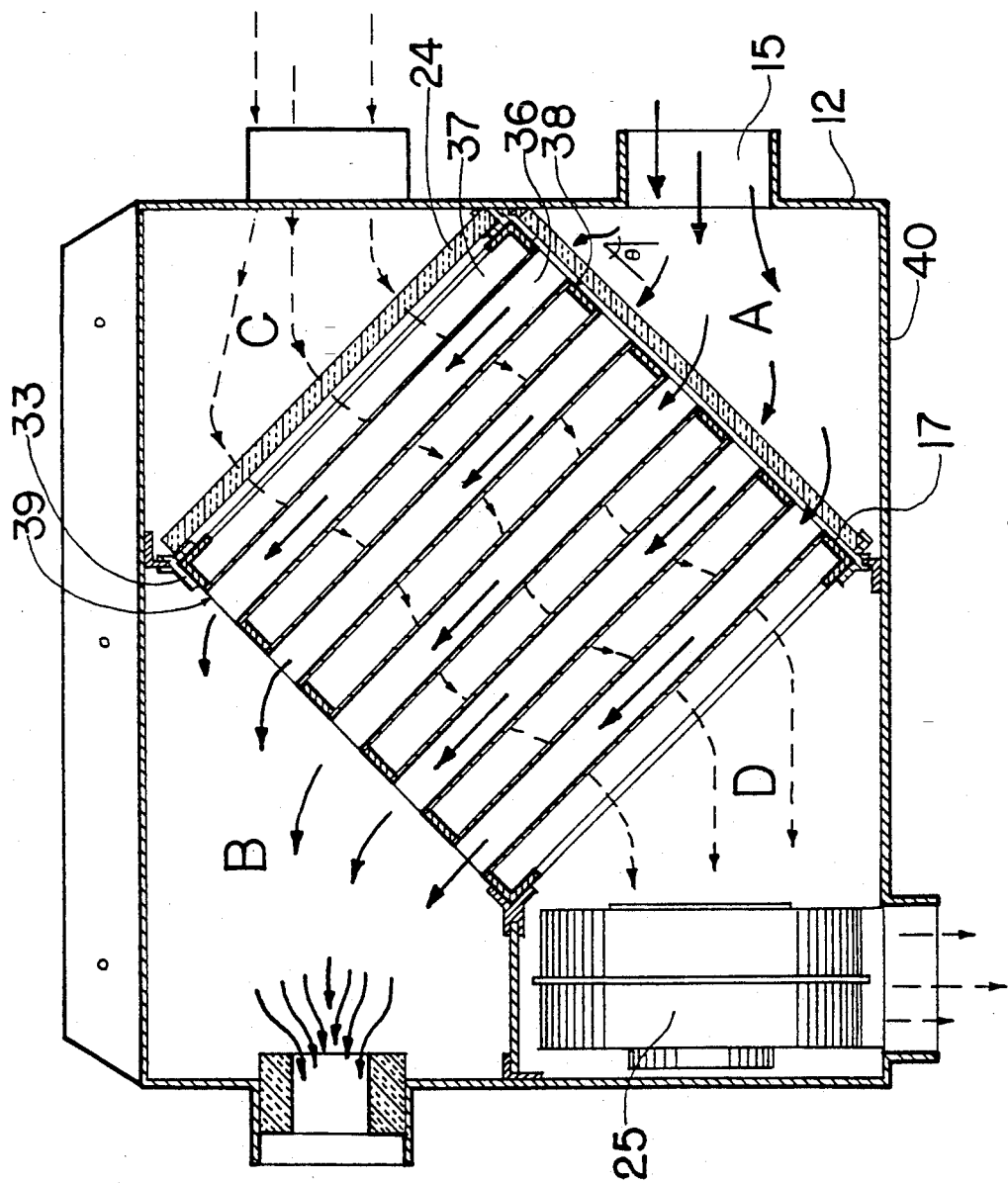
FIG. 8 is a cut view according to line 8—8 of FIG. 3, dotted arrows and lines representing cold medium flow and solid arrows representing warm medium flow.

As one can observe on figures, the system for recuperating heat of my invention is characterized by an independant unit treating humid hot air from dryer and recuperating energy by means of a cross heat exchanger. More precisely, at FIG. 1, device comprising a box number 10 is attached to a cover 11 with fixations 13 such as piano type hinges. Device includes also hook 14 to hang it. On right side 12 FIG. 3 of box 10, an entrance or inlet 15, generally 4" pipe from dryer, receives warm and humid air tube 20 FIG. 2 from dryer. Collar 16 FIG. 1 holds tube 20 FIG. 2 to device. Warm air comes into cell or chamber A, typical pressure +0.25 in. of H$_2$O, or +,06 kPa or +,6 mBar and passes through filter 17 then in exchanger 18 occupying the volume of a first chamber 18, through a first set of channels 36 FIG. 8 until warm air from first inlet 15 is cooled and goes out freely in chamber B, FIG. 1. Cell B is also lightly pressurized, +,03 kPa typically, to ensure a contact time long enough for warm gas inside channels 36 to abandon maximum heat without causing excessive back pressure on dryer, pressure being maintained by different restrictions, of which the donut or ring 22 (FIG. 6) at exit, first outlet 19, pipe length 30 FIG. 2 and the restriction caused by cover 21 outside the house, FIG. 1A. Cold air circuit implies a quantity of cold air in cell C around double that of warm air of cell A and therefore entrance or second inlet 23 is big, FIG. 3 using preferably two inlet areas of four in. (10 cm) diameter.

Filter 17 is destined to hot, humid, lint laden air. Filter 24 for cold air may be different from filter 17. Fresh air flows through a second set of channels 37 at 90° to warm air stream, both streams forming separate and cross flows in exchanger 18, fresh air from cell C recuperating heat and going out in cell D. Fresh air so heated is aspirated by fan 25. Fan is totally closed, except for vacuum 29 inlet and for exit 26 FIG. 2. To maintain pressure of each cell A B C D at required levels, one has to seal compartments A B C D. For these purposes, cover 11 includes a diamond 27 FIG. 1 of same form as contour of exchanger and which isolates the sections by means of a rubber sponge ribbon. Same insulation being also placed around frame 31 that adjusts on frame of box 10. Same type of insulation is used on back 28 where the exchanger sits, preferably in same manner as insulation 27 and 31 on door 11.

Positive pressure measured in zone A is typically +,06 kPa, pressure being reduced passing through exchanger +,03 kPa in B, exit of cell B. At exterior of house, there is normally a trap 21 FIG. 1A tending to increase pressure in piping and consequently in cell B.

In cell C one reads a negative pressure of −0,03 kPa; in cell D there is a negative pressure of −,03 kPA, approximately the same as inlet C, considering experimental error. At exterior of cell D, pressure is slightly positive caused by blowing by fan 25. Hot air comes from dryer at inlet 15 four in., ten cm in diameter, (13 sq. in. 84 cm² in area); warm moist air expands in cell A and eventually attacks a first exit surface 38 FIG. 7 of 12"×12" or 144 sq. in., the area being multiplied by 144/13 thereby reducing back pressure exerted on dryer. By cooling warm air from dryer, there is a lower volume and therefore a vacuum, thereby eliminating pratically resistance to air flow at exit end of exchanger. Resistance to flow depends on length of pipe 30 and size of restrictions 21 FIG. 1A and 19 FIG. 6. In cell A FIG. 7, filter 17 is supported at the bottom in Y-with-slide 34 and at top, filter 17 is pushed against the core 18 and more particularly against the exit surface 38 by the thrust of warm air from dryer and also held mechanically between core side and wall 12 of box, leaving little space for hot air to go around filter: hot air must therefore be filtered. The orientation of filter 17 as well as that of exit surface 38 is at an acute angle 0 FIG. 8 with respect to first inlet stream 15 from dryer, thereby forming a rectangle triangle of which filter 17 is the hypothenuse and the sides are wall 12 and bottom 40 of case 10, with an isoceles triangle of 45 in our prefered embodiment. In cell C, filter 24 is sitting at bottom in slide of the Y-with-slide 34 FIG. 7 and at upper part on side of Y-without-slide 33, FIG. 8 filter 24 being placed at angle of 45° and maintained in place by gravity and by the sucking caused by fan 25 aspiration.

When unit 10 is installed at more than one meter from a floor, FIG. 9, one may feed air 23 by means of a pipe going down to floor 42, where temperature is slightly colder I have observed that temperature at entrance 23 normally around 22° C. increases to 50° C. at exit 26 for a small volume of cooling air during normal drying.

Warm air temperature at first inlet 15 of unit was 62° C. and after freeing energy in unit 18, cooled air goes out of restriction ring 19 at 36 C. Energy recuperation is increasingly important as air volume of cooling is increased and initial temperature is low. It is desirable that the volume of cooling air at inlet 23 be at least twice the warm air flow at exit 15 of dryer 41.

Fan capacity of 0,5 amp. at 110 volts is 55 watts. Dryer capacity is 1500 watts. It would be preferable to double fan capacity to recuperate more heat. At the limit a maximum of recuperation will be obtained with an infinite volume of cooling air, which would lower temperature from 62° to initial level of cooling air, namely 22° C.: that would be equivalent to 100%, a decrease from 62° C. to 36° C. giving $$\frac{62 - 36}{62 - 22} \times 100\%$$

or 65% recuperation.

DESIGN CONSIDERATION FOR MOISTURE SEPARATION: Resistance to flow of warm air into first channels 36 is decreased with length of side 38 of first chamber assuming a large number of heat exchange channels. Length of side is a function of length of boxlike housing divided by cos $\theta$ where $\theta$ is angle FIG. 8 between axes formed by first channels and the direction of flow of incoming air from dryer; as $\theta$ increases there being more area of contact in chamber A for a given housing dimension. The corresponding side of first chamber facing chamber C should be at 90 degrees to axes of flow of warm air in channels 36 for maximum heat tranfer contact. To get a corresponding increase in contact with cold medium in chamber C, cos $\theta$ should also be increased, the efficiency being best in both chambers when Oa=Oc and therefore 45°. For condensation of water, degree of condensation varies with maximum of contact length of channels 36, angle of collection $\theta$ and surface tension of the warm medium. I have found that an angle $\theta$ of more than 20° with the horizontal permits the free flowing of condensed water, an angle of more than 60° would cause direct escape of water in the upper portion of first cooling channels and little condensation, and an angle of less than 60° is necessary for collecting water along first exit surface 36 by surface tension, making sure water does not flow back into screen 17, but it be collected in trough of Y-withslide 34 A and eventually drips into pan 32 for collection in sealed pot 35. INSTALLATION PROCEDURE:referring to the drawings, there is shown a pipe 15 from clothes dryer, connect it to right side of device thereby building a pressure of +,06 kPA in cubicle A. Hot gases pass through a filter 17 and through a diamond pack 18 containing a cross piping system, exiting in cubicle B then passing through a restriction 19 before exiting to the outside atmosphere. The pressure of the hot air in cubicle B is typically +,03 kPa. The ambiant air is aspirated into cubicle D by a fan 25 which causes a negative pressure in D of −,03 kPA and which draws the ambiant air in channels 37 across the piping system 36 thereby leaving a negative pressure in D of −,03 kPA. At C it is desirable to double the entrance area of cold air with respect to pipe area of clothes dryer exit.

An insulating material 31 is under compression when the door is closed making sure that each compartment keeps its own pressure or vacuum independant from the neighbourhood pressure. Make sure there is a drain 32 provided in cubicle A for condensing water, said drain being covered by a sealing pot 35.

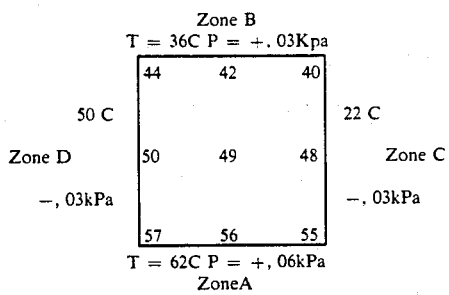

I claim:

1. A heat recuperating device which utilizes hot exhaust gaseous media from a clothes dryer to heat ambient air, the device comprising:

a housing of rectangular cross section and being cubical with six faces of which five are closed on all sides and one face comprises a sealed removable door, said housing comprising a first set of inlet and outlet ports for hot exhaust gaseous media and a second set of inlet and outlet ports for ambient air;

a heat exchanger core of quadrangular cross section, cubical and defining a first set of channels for hot gaseous media and a second set of channels for ambient air, said sets of channels being perpendicular to each other and each of the channels of each set opening at opposite parallel faces of said core, said heat exchanger core removably positioned diagonally within said housing thereby defining in said housing a first and a second pair of compartments, the compartments of each pair defining an inlet and an outlet compartment, the inlet and outlet compartments of the first pair being in communication with said first set of channels and with said first set of inlet and outlet ports respectively, and the inlet and outlet compartments of the second pair being in communication with said second set of channels and with said second set of inlet and outlet ports respectively;

sealing means between said housing, said door and said heat exchanger core to seal each compartment one from the other;

mounting means in said housing for releasably receiving said heat exchanger core;

means of filtration for hot exhaust gaseous media mounted in the inlet compartment of said first pair of compartments;

power operated means to draw ambient air through said inlet port of said second set of inlet and outlet ports and to discharge said ambient air into said outlet port of said second set of inlet and outlet ports, said means to draw ambient air is located within said outlet compartment of said second pair of compartments.

2. A device such as defined in claim 1 wherein said means to draw ambient air is a power operated fan capable of creating a negative pressure in said outlet compartment of said second pair of compartments.

3. A device such as defined in claim 2 wherein said fan has a capacity to draw a volume of said ambient air at least double the volume of hot gaseous media from the dryer.

4. A device such as defined in claim 1 which when installed, has said inlet compartment of said first pair of compartments placed at a lower level than said outlet compartment of said first pair of compartments so that said first channels carrying hot exhaust gaseous media are upwardly sloping, so that condensing humidity in said first channels flows back towards said inlet compartment of said first pair of compartments.

5. A device as defined in claim 4 wherein said inlet compartment of said first pair of compartments comprises a drain and a sealed removable receptacle connected to said drain, said receptacle capable of receiving said condensing humidity.

6. A device as defined in claim 1, which when installed has said outlet port of said second set of inlet and outlet ports downwardly directed to increase convection in ambient surroundings.

7. A device as defined in claim 1 wherein said compartments comprise sides positioned relative one to the other at an acute angle varying from 35° to 55°.

8. A device as defined in claim 2 wherein said fan is capable of creating a negative pressure of at least ,06 kPa so as to draw ambient air from a location independent and away from the dryer.

* * * * *